(12) United States Patent
Shields

(10) Patent No.: US 7,545,930 B1
(45) Date of Patent: Jun. 9, 2009

(54) PORTABLE TERMINAL

(75) Inventor: Adrian Shields, Fife (GB)

(73) Assignee: NCR Corporation, Dayton, OH (US)

( * ) Notice: Subject to any disclaimer, the term of this patent is extended or adjusted under 35 U.S.C. 154(b) by 1516 days.

(21) Appl. No.: 09/651,979

(22) Filed: Aug. 31, 2000

(30) Foreign Application Priority Data

Sep. 1, 1999 (GB) ................................. 9920502.3

(51) Int. Cl.
*H04L 9/00* (2006.01)
*G06Q 40/00* (2006.01)

(52) U.S. Cl. .......................... 380/44; 380/285; 380/264; 705/43

(58) Field of Classification Search ................. 713/171; 380/285, 264, 44; 705/43
See application file for complete search history.

(56) References Cited

U.S. PATENT DOCUMENTS

| | | | | |
|---|---|---|---|---|
| 4,529,870 | A * | 7/1985 | Chaum | 235/380 |
| 5,278,905 | A * | 1/1994 | McNair | 380/44 |
| 5,878,138 | A * | 3/1999 | Yacobi | 705/69 |
| 6,038,318 | A * | 3/2000 | Roden | 380/30 |
| 6,980,660 | B1 * | 12/2005 | Hind et al. | 380/282 |
| 2002/0062284 | A1 * | 5/2002 | Kawan | 705/43 |

FOREIGN PATENT DOCUMENTS

| | | |
|---|---|---|
| EP | 0455064 | 11/1991 |
| GB | 2329499 | 3/1999 |
| WO | 9522793 | 8/1995 |
| WO | 9704395 | 2/1997 |
| WO | 9840853 | 9/1998 |
| WO | 9858322 | 12/1998 |

OTHER PUBLICATIONS

Schneier, Bruce, Applied Cryptography 1997, John Wiley & Sons, Inc., 2nd ed., pp. 62 and 63.*
Handbook of Applied Cryptography, Menezes et al, CRC Press, 1997.*
Menezes et al, "Handbook of Applied Cryptography", CRC Press 1996, pp. 170-171.*
Menezes et al, "Handbook of Applied Cryptography," 1997, pp. 170-172, 494, 552.*

* cited by examiner

*Primary Examiner*—Emmanuel L Moise
*Assistant Examiner*—Michael Pyzocha
(74) *Attorney, Agent, or Firm*—Gregory A. Welte

(57) ABSTRACT

A portable terminal (10) for encrypting information is described. The terminal (10) generates a new key for each transaction, where the new key is generated using one or more properties of the terminal (10). The one or more properties are variable and may include the history of usage of the terminal, and/or the date and time settings. The terminal (10) may generate a unique challenge in addition to the new key so that a unique challenge can be issued for each transaction. A method of encrypting information in a portable terminal, a method of communicating encrypted information between a portable terminal and a self-service terminal, and a transaction system comprising a self-service terminal (52) and a portable terminal (10) are also described.

17 Claims, 3 Drawing Sheets

PORTABLE TERMINAL

BACKGROUND OF THE INVENTION

The present invention relates to a portable terminal. In particular, the invention relates to a portable terminal for encrypting information and to a method of encrypting information in a portable terminal, such as a personal digital assistant (PDA).

PDAs are used for storing personal information and for transferring stored personal information between computer systems. It is also possible to use a PDA to prepare and store highly confidential personal information such as transaction information for execution at a self-service terminal (SST) such as an automated teller machine (ATM).

To provide some security for the transaction information it would be desirable to encrypt the transaction information that is stored on and transmitted from the PDA. However, a conventional PDA is not an inherently secure device; it has minimal tamper resistance, which means that there is no secure area for storing a secret cryptographic key. The lack of secure storage means that industry-standard cryptographic techniques cannot be used with a conventional PDA.

SUMMARY OF THE INVENTION

According to a first aspect of the invention there is provided a portable terminal for encrypting information characterized in that the terminal generates a new key for each transaction, where the new key is generated using one or more properties of the portable terminal.

It will be appreciated that the one or more properties of the portable terminal are properties that vary with usage of the terminal or with time; that is, the properties are variable. This ensures that the new key is unique and unpredictable.

The new key is generated from an unsecure area of memory. Thus, no dedicated security module is required.

The new key may be generated when the transaction is prepared; that is, when the new transaction is entered into the portable terminal. Alternatively, and more preferably, the new key is generated when the transaction is executed; that is, immediately prior to communicating the new transaction from the portable terminal to a self-service terminal.

Preferably, the new key is a symmetric key. Using a symmetric key provides improved performance and ensures compatibility with existing financial systems that generally use symmetric key technology.

A user may enter an identification during preparation of a transaction. Alternatively, the user may enter an identification a short period of time prior to executing the transaction; that is, a short period of time, such as ten seconds, prior to communicating the transaction from the portable terminal to an SST. The identification may be a PIN (personal identification number), or it may be biometrics-based.

Preferably, the one or more properties of the portable terminal include the history of usage of the terminal and/or the date and time settings. The history of usage may include: button selections, pointer movements, data entered, and such like. In some terminals, these properties are stored in system memory. Thus, the system memory is used as the seed (the starting value used by a pseudo-random number generating routine) from which the new key is generated. As the system memory changes with each keystroke, a unique key is generated for each transaction.

Preferably, the portable terminal generates a unique challenge in addition to the new key so that a unique challenge can be issued for each transaction.

Preferably, the new key and the unique challenge are encrypted using a public key issued by a host.

By virtue of this aspect of the invention a portable terminal uses unpredictable data to generate a new key for each transaction. This new key can be used in association with a public key issued by an ATM owner to provide a secure communications channel between the portable terminal and the ATM. One advantage of this aspect of the invention is that no assumptions are made regarding protected storage areas within the portable terminal.

The portable terminal may be a PDA. Alternatively, the portable terminal may be a portable computer such as a laptop computer, or the terminal may be a portable communication device such as a cellular telephone.

According to a second aspect of the invention there is provided a method of encrypting information in a portable terminal, the method being characterized by the steps of: using one or more properties of the portable terminal to obtain a sequence of values, and generating a new key based on the sequence of values.

Preferably, the method includes the further step of generating a unique challenge value based on the sequence of values.

Preferably, the method includes the further steps of encrypting the new key and the challenge value using a public key issued by a host, and transmitting the encrypted new key and challenge value to the host.

Preferably, the step of generating a new key based on the sequence of values uses standard cryptographic techniques, such as generating a hash value of the sequence of values using MD4, or MD5, or SHA-1, or such like hashing algorithm. A typical hashing algorithm (such as MD5) generally takes a sequence of values and converts it into a fixed string of digits.

In one embodiment the hash value is split into two halves, left and right. The right half being used as an intermediate key to encrypt the left half, which, after encryption, becomes the new key. The original left half being used as an intermediate key to encrypt the original right half, which, after encryption, becomes the challenge value. It will be appreciated that splitting the hash value into a left and a right component is just one convenient method of generating a new key and a challenge value.

According to a third aspect of the invention there is provided a method of communicating encrypted information between a portable terminal and a self-service terminal, the method being characterized by the steps of: using one or more properties of the portable terminal to obtain a sequence of values, generating a new key based on the sequence of values, generating a challenge value based on the sequence of values, encrypting the new key and the challenge value using a public key, and transmitting the encrypted key and challenge value to the self-service terminal.

Preferably, the method further comprises the steps of the SST: generating a new challenge value, encrypting the generated challenge value using the new key, transmitting the encrypted challenge value to the portable terminal, and awaiting a correct response to the transmitted challenge value being transmitted by the portable terminal before accepting any subsequent transaction.

As a unique challenge is issued by the portable terminal and also by the self-service terminal, replay attacks (whereby a third party intercepts, records, and attempts to repeat a transmission from a portable terminal to an SST) can be avoided because the third party will not be able to respond correctly to the new challenge issued by the SST. This is because a third party does not know the new key so the third party cannot decrypt the challenge value issued by the SST.

According to a fourth aspect of the invention there is provided a transaction system comprising a self-service terminal and a portable terminal characterized in that the portable terminal is operable to use one or more properties of the portable terminal for obtaining a sequence of values, and to generate a new key based on this sequence of values, and the portable terminal and the self-service terminal are adapted for intercommunicating using the new key.

According to a fifth aspect of the invention there is provided a method of conducting a transaction at a self-service terminal, the method comprising the steps of: using a portable terminal to prepare an incomplete transaction, conveying the portable terminal to the self-service terminal, completing the incomplete transaction, and executing the completed transaction by the portable terminal generating a new encryption key for that transaction using one or more properties of the portable terminal.

The step of completing the transaction may comprise the step of a user entering an identifier. The identifier may be a PIN.

By virtue of this aspect of the invention, the incomplete transaction does not include the user's identifier so that if the incomplete transaction is copied or read by a third party the user's identifier will not be disclosed.

According to a sixth aspect of the invention there is provided a method of determining if a self-service terminal is an authentic terminal, the method comprising the steps of: using one or more properties of a portable terminal to obtain a sequence of values, generating a new key based on the sequence of values, generating a challenge value based on the sequence of values, encrypting the new key and challenge value using a public key provided by an institution, transmitting the encrypted key and challenge to the self-service terminal, receiving a response from the self-service terminal, decrypting the response using the new key, and halting any further transmission unless the decrypted response includes a correct reply to the challenge value.

It will be appreciated that this invention has particular advantages when associated with portable terminals that do not have secure storage areas for storing one or more encryption keys.

As a new key is generated for each transaction, and as the seed that is used to generate the new key is unpredictable (it may be based on the time of creating and/or executing the transaction and/or the terminal usage), a third party cannot predict what the new key will be, even if the third party knows the algorithm used to generate the new key, thereby greatly reducing the possibility of fraud.

As there is no requirement for secure storage within the portable terminal, data can be uploaded to and downloaded from a personal computer (PC) without affecting the ability of the portable terminal to communicate securely with self-service terminals. This is important for portable terminals that require to synchronize their data, for example, with personal computers.

In one embodiment the portable terminal may be a 3Com (trade mark) Palm IIIx (trade mark) PDA, and the SST may be an ATM having an IrDA (Infra-red Data Association) compliant infra-red port in the user interface.

BRIEF DESCRIPTION OF THE DRAWINGS

These and other aspects of the invention will become apparent from the following specific description, given by way of example, with reference to the accompanying drawings, in which.

DETAILED DESCRIPTION

Figure 1:
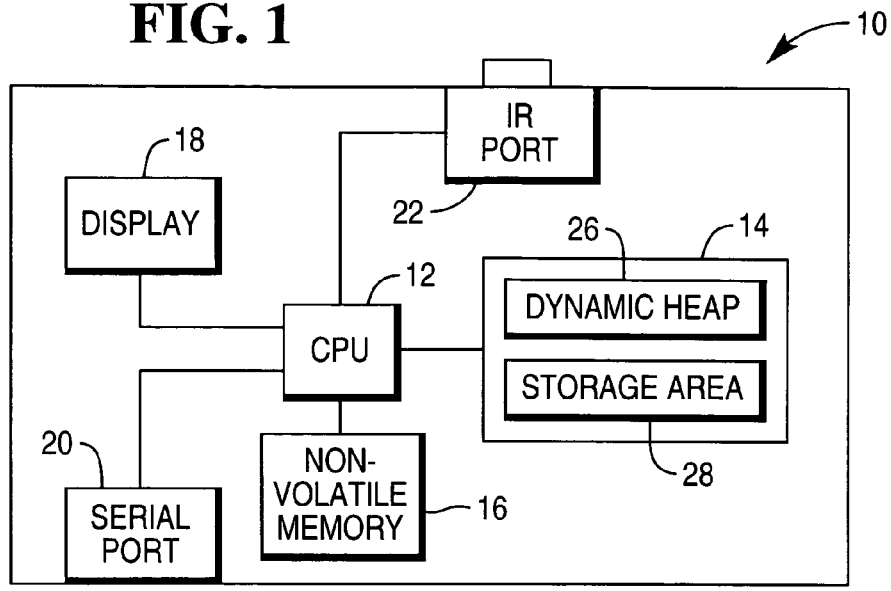
FIG. 1 is a block diagram of a portable terminal according to one embodiment of the present invention.

Referring to FIG. 1, the portable terminal 10 is a PDA such as 3Com (trade mark) Palm IIIx (trade mark), for example. PDA 10 comprises a controller 12 and associated volatile memory 14 and non-volatile memory 16, a touch-sensitive display 18, a serial communication port 20 for receiving a communication cable, and a communication port 22 in the form of an IrDA-compliant infra-red port for wireless transmission and reception of information.

The non-volatile memory 16 is FLASH EPROM and contains the BIOS for booting-up the PDA 10. The FLASH EPROM 16 also stores the applications that are pre-programmed into the PDA 10, such as a calendar application, a notepad application, and such like.

The volatile memory 14 is logically split into two parts: a dynamic heap 26 and a storage area 28.

The dynamic heap 26 is used for storing dynamic data such as global variables, system dynamic allocations (TCP/IP, IrDA, and such like), application stacks, and temporary memory allocations. The keystrokes entered into the PDA 10 are all stored in the dynamic heap 26. The dynamic heap 26 is cleared when the PDA 10 is reset.

The storage area 28 is used for data and application storage, and is analogous to disk storage in a desktop personal computer. The storage area 28 is powered by the PDA batteries (not shown) and by a large capacitor, so that the storage area 28 retains data even when the PDA 110 is reset or the batteries are replaced. The contents of storage area 28 are in accordance with the present invention and are more fully described in connection with the discussion of FIG. 2.

As the PDA 10 is being used, the contents of the dynamic heap 26 are constantly changing. Thus, two identical PDAs, storing identical applications, will have different contents on their respective dynamic heaps.

Figure 2:
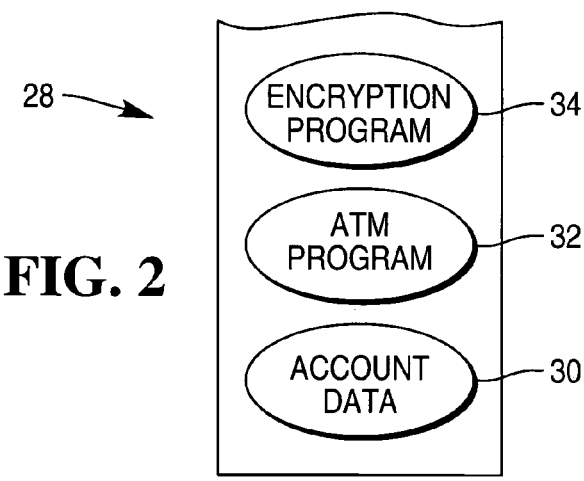
FIG. 2 is a block diagram illustrating some of the contents of a memory in the terminal of FIG. 1.

Referring to FIG. 2, there is shown a block diagram illustrating the contents of the storage area 28. Area 28 contains account data 30 for a financial institution, an ATM program 32 for enabling a user to prepare an ATM transaction using the PDA, and an encryption program 34 for generating a new key for encrypting a prepared ATM transaction.

The account data 30 is data that is retained for use by the ATM program 32. There are no special security requirements for storing the account data 30. The account data includes details of the user's bank account number, a bank identification number, and a public key issued by the financial institution. For increased security, the public key is obtained directly from the financial institution by the PDA user attending a branch of the institution in person and downloading the public key. Updates to the public key may be obtained by secure remote downloading if the new public key has the necessary authentication, such as a certificate, digital signature, or such like.

Referring to FIG. 3, in use, the ATM program 32 provides the user with a series of screens that are similar to the screens used in a typical ATM. In this embodiment, the first screen 40 requests the user to type in his/her PIN. The second screen 42 provides the user with one or more transaction options, such as withdraw cash, print account balance, transfer funds, and such like. Subsequent screens will depend on the transaction option selected. If the withdraw cash option is selected, the third screen will invite the user to enter the amount to be withdrawn.

Once the transaction details have been entered, the ATM program 32 displays a screen 44 for prompting the user to enter a transaction lifetime. This lifetime determines how long the transaction will remain valid for: that is, the latest time by which the transaction must be executed.

Once the lifetime has been entered, the ATM program 32 displays an icon 46 to remind the PDA user that a transaction is awaiting execution. The user (or a trusted third party) then conveys the PDA 10 to an ATM, as described with reference to FIG. 4.

Figure 4:
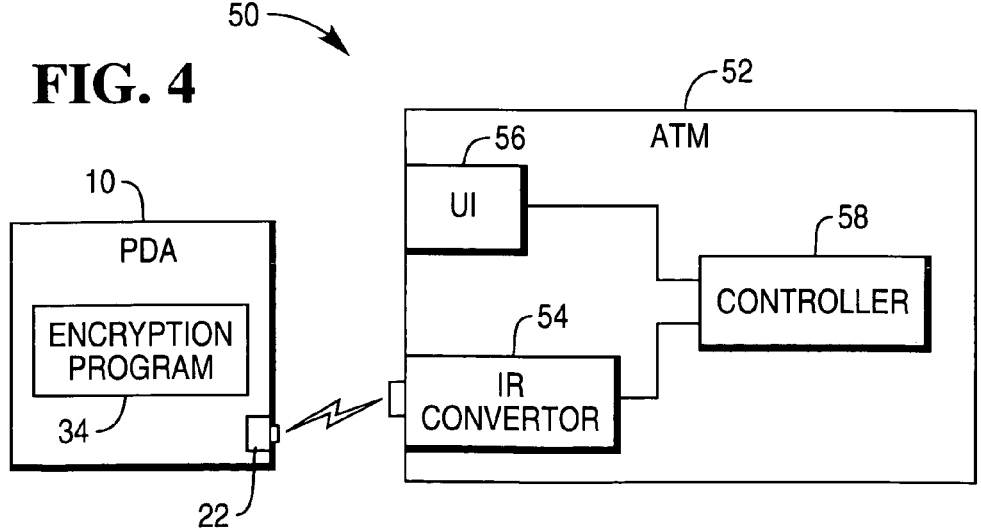
FIG. 4 is a block diagram of a transaction system comprising the portable terminal of FIG. 1 in communication with a self-service terminal.
Figure 3A:
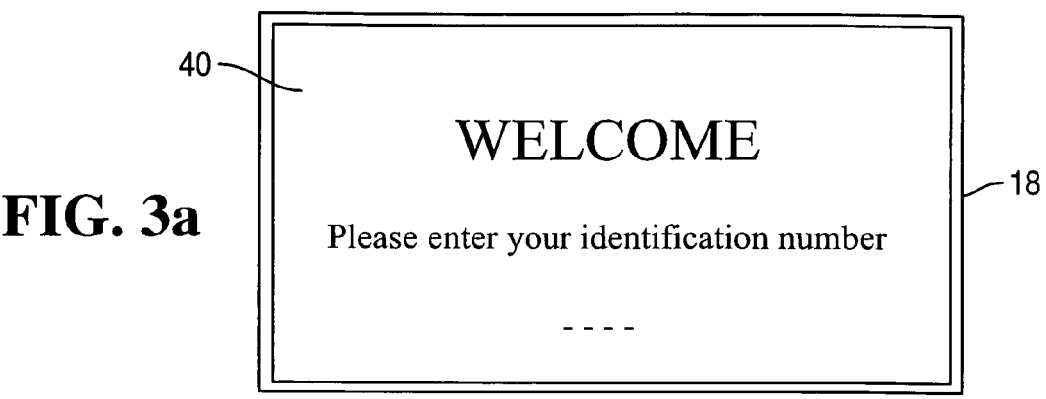
FIGS. 3a to 3d illustrate some of the screens displayed by the portable terminal of FIG. 1 during operation of the terminal.
Figure 3B:
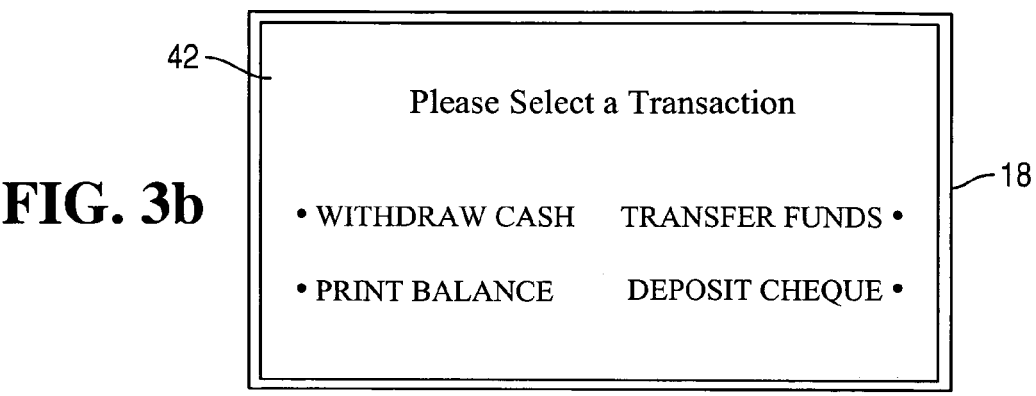
Figure 3C:
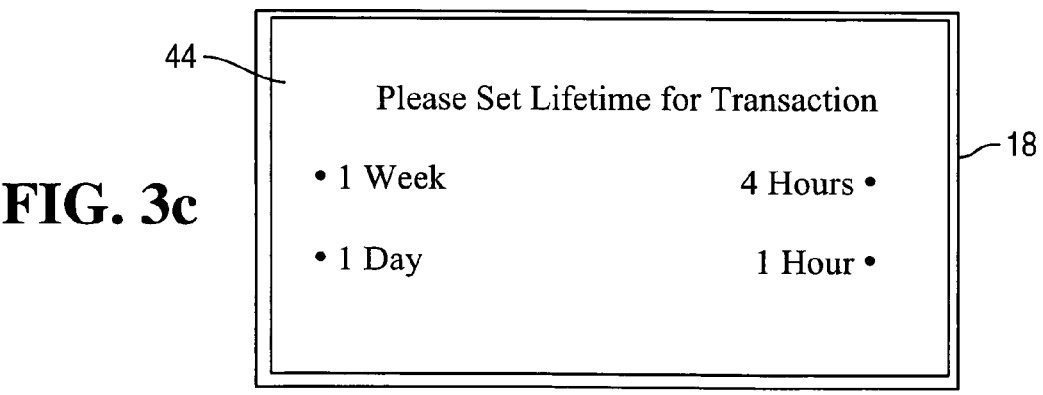
Figure 3D:
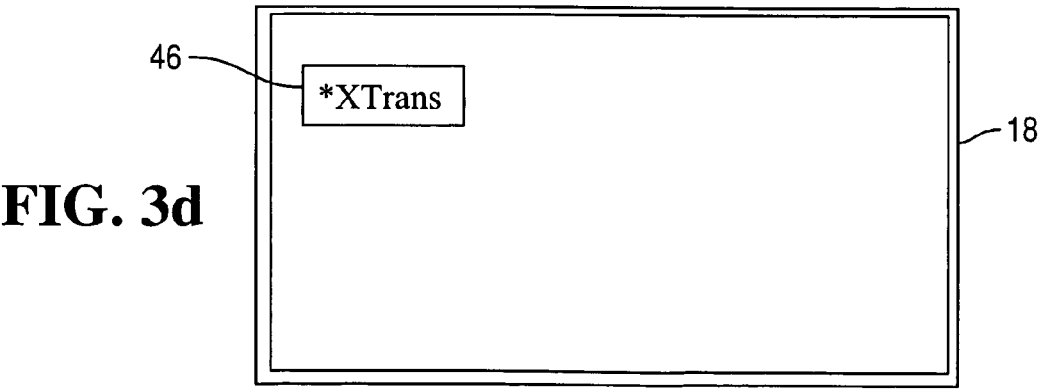

FIG. 4 is a block diagram of a transaction system 50 comprising a PDA 10 in communication with a self-service terminal in the form of an ATM 52. ATM 52 has a communication interface 54 in the form of an IR to electrical signal converter. ATM 52 also has a conventional user interface 56 (which may be a touchscreen, a keypad, a loudspeaker and microphone interface, or such like) to allow a user to input transaction details manually.

When at ATM 52, the user of the PDA 10 aligns the IR port 22 with IR converter 54 located in the ATM 52 and selects the 'Execute transaction' icon 46 on the display 18.

Figure 5:
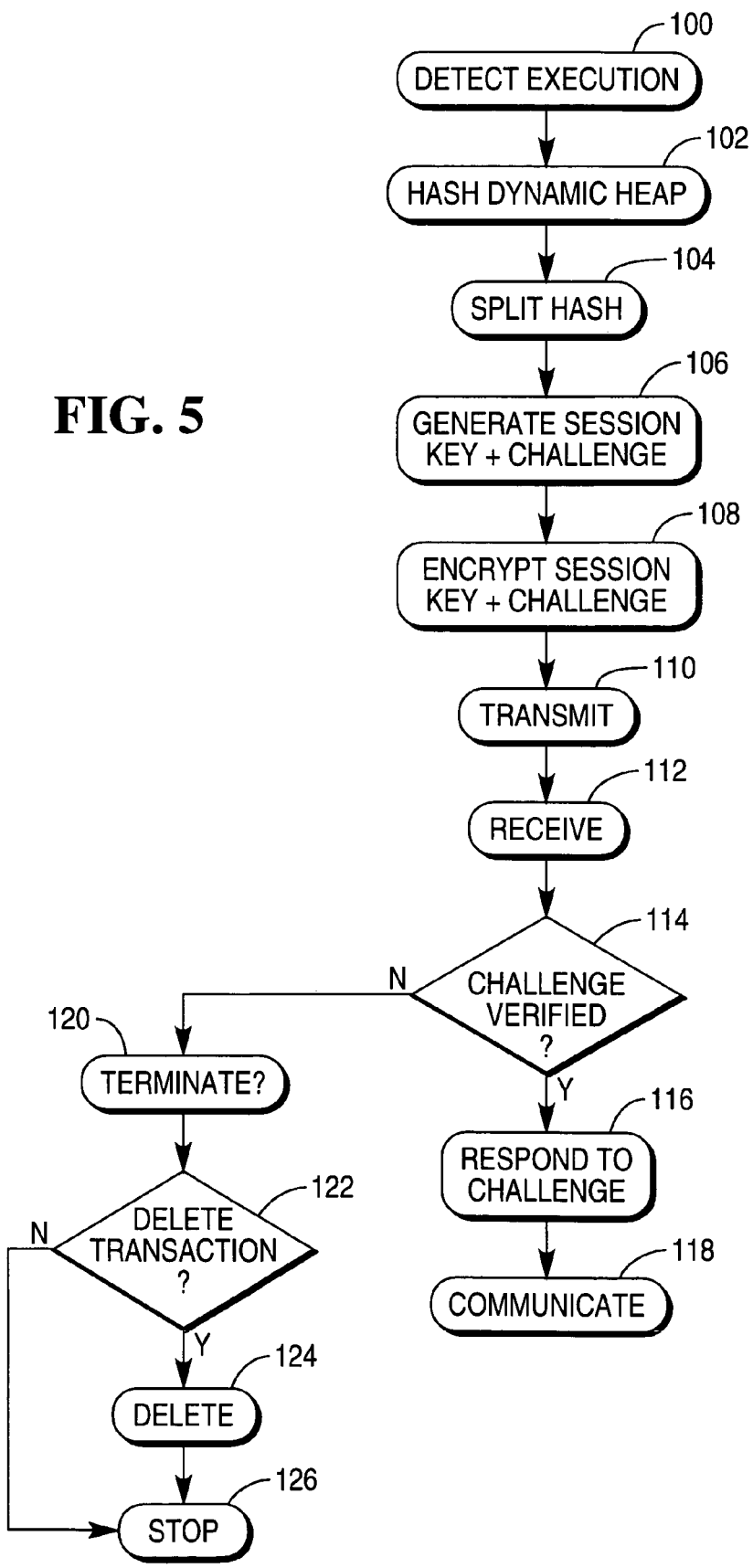
FIG. 5 is a flowchart illustrating the steps involved in communicating secure information between the terminals shown in FIG. 4.

FIG. 5 illustrates the steps involved in communicating secure information between PDA 10 and ATM 52.

On detecting (step 100) selection of icon 46, the controller 12 invokes the encryption program 34 (FIG. 2) to ensure secure communication between the PDA 10 and the ATM 52.

The encryption program 34 generates a new key for this transaction by obtaining a seed, and then applying a hashing algorithm (step 102), in this embodiment MD5, to the seed. The seed is obtained by the program 34 reading the contents of the dynamic heap 26 (FIG. 1), requesting the current date and time from the operating system, and appending the date and time settings to the read contents. In some embodiments, only a portion of the dynamic heap 26 may be used, for example, several hundred bytes of the dynamic heap may be used.

The hashed value is then split into two halves (step 104): left and right. Two operations are then performed on the left half and the right half to generate a unique session key and a unique challenge value (step 106).

In the first operation, the left half is used as a first intermediate key and the right half is used as first intermediate data. The first intermediate key is used to encrypt the first intermediate data to produce the new key (which is a symmetric session key). In the second operation, the right half is used as a second intermediate key and the left half is used as second intermediate data. The second intermediate key is used to encrypt the second intermediate data to produce a challenge value. The intermediate keys and intermediate data are then discarded (they may be deleted or retained in memory until more memory is required). Thus, a unique key and a unique challenge value have been produced using the hashed value of the contents of the dynamic heap 26.

PDA 10 then uses the public key stored in the account data 30 (FIG. 2) to encrypt the new key and challenge value (step 108). The encrypted key and challenge value are then transmitted (step 110) from IR port 22 to IR converter 54.

IR converter 54 receives the encrypted transmission and conveys the transmission to a controller 58. Controller 58 decrypts (using the private key counterpart to the public key) the encrypted transmission to recover the new (unique) session key and challenge value.

Controller 58 responds to the original challenge value sent by the PDA 10 and prepares a new challenge value. Controller 58 conveys to the PDA 10 the new challenge and the original challenge using the new session key to encrypt the transmission.

PDA 10 receives (step 112) the encrypted challenges and verifies (step 114) that the ATM 52 has correctly responded to the original challenge.

If the ATM 52 has correctly responded to the original challenge then the PDA 10 responds to the ATMs challenge (step 116) and the ATM 52 verifies this response; thereafter, secure communication can take place between the PDA 10 and the ATM 52, and the prepared transaction can be executed.

If the ATM 52 has not correctly responded to the original challenge, then the communication between the PDA 10 and the ATM 52 is terminated (step 120) and the PDA 10 requests (step 122) if the user wishes to delete the prepared transaction. If the user wishes to delete the transaction, for example to avoid a possible security violation, then the transaction is deleted (step 124). The communication is then halted (step 126) so that if the transaction is to be executed then the PDA 10 must revert to step 100 where a new session key and challenge value is generated.

Various modifications may be made to the above described embodiment within the scope of the invention, for example, the portable terminal may be a communications device such as a cellular telephone. The ATM program 32 may not use a transaction lifetime. In other embodiments, a completed transaction may be stored in the PDA in encrypted form. In other embodiments, different hashing algorithms may be used. Different methods for generating a session key and a challenge value may be used to that described above.

What is claimed is:

1. A method of operating a portable computer, comprising:
   a) storing records of events experienced by the computer in user-accessible memory within the computer;
   b) using one or more of the records as seed for generating plain text of a first session key K1, wherein
      (A) a hashing algorithm is applied to the seed to provide a hashed value which is split into two portions and
      (B) the two portions are processed to provide K1; and then
   c) encrypting K1, transmitting K1(encrypted) to an external terminal, receiving an encrypted response from the external terminal, and de-crypting the encrypted response using the plain text of K1.

2. Method according to claim 1, and further comprising:
   d) repeating processes of paragraphs (a) and (b) to produce a second session key K2, different from the first session key K1; and
   e) using K2 in a transaction with an external terminal.

3. Method according to claim 1, wherein the records used as seed include at least one element selected from the following group:
1) recorded button selections,
2) recorded pointer movements,
3) recorded data entered by a user,
4) current date setting, and
5) current time setting.

4. Method according to claim 1, wherein the portable computer requires entry of a Personal Identification Number, PIN, prior to generation of the encryption key, and will not complete the transaction without the PIN.

5. A method, comprising:
a) using a portable computer to
i) generate a first session key K1, based on one or more seeds derived from data contained in user-accessible memory, wherein
(A) a hashing algorithm is applied to the one or more seeds to provide a hashed value which is split into two portions and
(B) the two portions are processed to provide K1;
ii) encrypt K1 into K1(encrypted), using a public key PK;
iii) transmitting K1(encrypted) to an external terminal in connection with a first transaction;
b) using the portable computer to
i) generate a second session key K2, based on one or more seeds derived from data contained in user-accessible memory, wherein
(A) a hashing algorithm is applied to the one or more seeds to provide a hashed value which is split into two portions and
(B) the two portions are processed to provide K2;
ii) encrypt K2 into K2(encrypted), using a the public key PK;
iii) transmitting K2(encrypted) to an external terminal in connection with a second transaction.

6. Method according to claim 5, wherein the data from which as the seeds are derived include at least one element selected from the following group:
1) recorded button selections,
2) recorded pointer movements,
3) recorded data entered by a user,
4) current date setting, and
5) current time setting.

7. Method according to claim 5, and further comprising:
c) in connection with the first transaction,
i) receiving into the portable computer an encrypted message EM1 from the external terminal, and
ii) de-crypting EM1 using K1.

8. Method according to claim 7, and further comprising:
d) in connection with the second transaction,
i) receiving into the portable computer an encrypted message EM2 from the external terminal, and
ii) de-crypting EM2 using K2.

9. Method according to claim 7, wherein the portable computer requires entry of a Personal Identification Number, PIN, prior to encryption, and will not complete the transaction without the PIN.

10. Method according to claim 5, wherein the portable computer requires entry of a Personal Identification Number, PIN, prior to generation of the encryption key, and will not complete the transaction without the PIN.

11. A method, comprising:
a) maintaining a commercially available Personal Digital Assistant, PDA, which has no secure area for storing an encryption key usable to encrypt outgoing data; and
b) using the PDA for encryption and transmission of a message to an external controller in connection with a financial transaction, wherein the encryption comprises deriving a seed from data stored in user-accessible memory; and deriving a session key from said seed, which session key is used in the financial transaction, and not used thereafter, wherein
(A) a hashing algorithm is applied to the seed to provide a hashed value which is split into two portions and
(B) the two portions are processed to provide the session key.

12. Apparatus, comprising:
a) a portable computer having
i) no secure area for storing an encryption key used to encrypt outgoing data;
ii) system memory, all of which is accessible to a user of the computer; and
iii) data stored in the system memory, which data changes over time;
b) means for
i) utilizing selected changing data in the system memory as a seed for generating a session key K1, wherein
(A) a hashing algorithm is applied to the seed to provide a hashed value which is split into two portions and
(B) the two portions are processed to provide K1;
ii) encrypting K1 into K1(encrypted); and
iii) transmitting K1(encrypted) to an external terminal.

13. Apparatus according to claim 12, wherein the data used as the seed includes at least one element selected from the following group:
1) recorded button selections,
2) recorded pointer movements,
3) recorded data entered by a user,
4) current date setting, and
5) current time setting.

14. Apparatus according to claim 13, and further comprising:
c) means for
i) receiving an encrypted message from the external terminal, and
ii) de-crypting the encrypted message using K1.

15. A portable computer, comprising:
a) means for storing records of events experienced by the computer in user-accessible memory within the computer;
b) means for using one or more of the records as a seed for generating an encryption key, wherein
(A) a hashing algorithm is applied to the seed to provide a hashed value which is split into two portions and
(B) the two portions are processed to provide the encryption key; and
c) means for using the encryption key in a transaction with an external terminal.

16. Method according to claim 15, wherein the records used as the seed include at least one element selected from the following group:
1) recorded button selections,
2) recorded pointer movements,
3) recorded data entered by a user,
4) current date setting, and
5) current time setting.

17. A method, comprising:
a) storing records of events experienced by a portable computer in user-accessible memory within the computer;
b) using one or more of the records as a seed for generating a session key K1, wherein (A) a hashing algorithm is applied to the seed to provide a hashed value which is split into two portions and
(B) the two portions are processed to provide K1;
c) encrypting K1 into K1(encrypted) using a public key;
d) transmitting K1(encrypted) to an external terminal;
e) at the external terminal, decrypting K1(encrypted) into K1;
f) encrypting a message M into M(encrypted) using K1 as key;
g) transmitting M(encrypted) to the portable computer; and
h) decrypting M(encrypted) using K1 within the portable computer.

* * * * *